_4/14/81_ OR 4,261,645 SR

United States Patent [19]
Sawamura et al.

[11] 4,261,645
[45] Apr. 14, 1981

[54] REFLECTION PREVENTIVE FILM HAVING AN ASPHERICAL LAYER

[75] Inventors: Mitsuharu Sawamura; Osamu Kamiya, both of Yokohama, Japan

[73] Assignee: Canon Kabushiki Kaisha, Tokyo, Japan

[21] Appl. No.: 5,019

[22] Filed: Jan. 19, 1979

[30] Foreign Application Priority Data

Jan. 20, 1978 [JP] Japan ............................. 53/5457

[51] Int. Cl.³ .......................................... G02B 1/10
[52] U.S. Cl. ............................................... 350/164
[58] Field of Search ............... 350/164, 165; 427/164, 427/165, 166, 167

[56] References Cited

U.S. PATENT DOCUMENTS 3,185,020  5/1965  Thelen ................... 350/164

FOREIGN PATENT DOCUMENTS 2443718  4/1975  Fed. Rep. of Germany ........... 427/164
1380793  1/1975  United Kingdom ..................... 350/164
381622   5/1973  U.S.S.R. ................................. 427/167

OTHER PUBLICATIONS

Pacey, "Multilayer Antireflection Coatings for Optical Components," Manufacturing Optics International, vol. 22, No. 5, 11–69, p. 270.
Baumeister, "Summer Course in Modern Methods of Optical Design," vol. 7, Multilayer Filters, U. of Rochester, 1963, pp. 20-4, 20-5, 20-22.

*Primary Examiner*—Alfred E. Smith
*Assistant Examiner*—Carolyn E. Fields
*Attorney, Agent, or Firm*—Fitzpatrick, Cella, Harper & Scinto

[57] ABSTRACT

An aspherical reflection preventive coating composed of a first thin film group includes one or more layers of thin film having an equal thickness, an aspherical thin film disposed on the thin film group and having an aspherical shape at the side opposite to the substrate, and a second thin film group disposed on the aspherical thin film, and comprising one or more layers of thin film, the films being arranged in the order as mentioned above from the side of the substrate.

5 Claims, 17 Drawing Figures

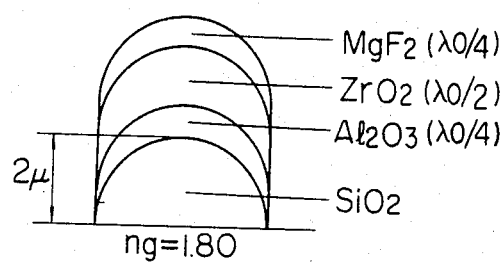
FIG. 1A
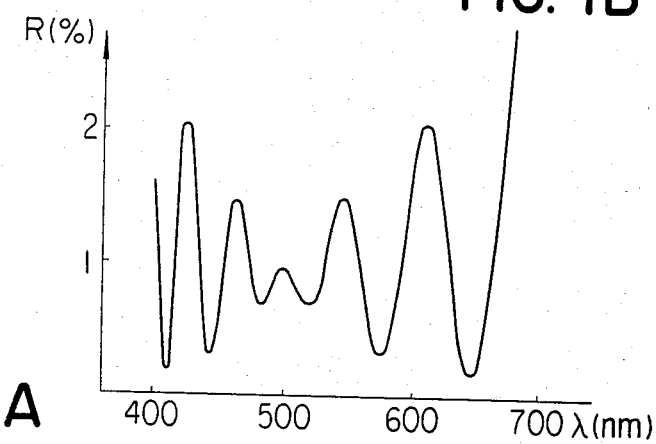
FIG. 1B
FIG. 2A
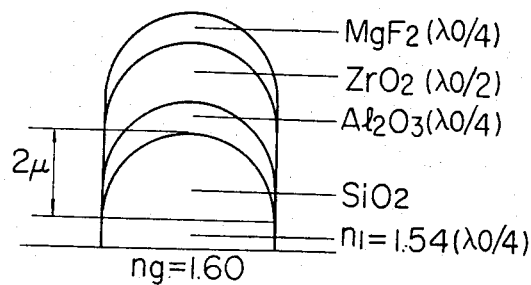
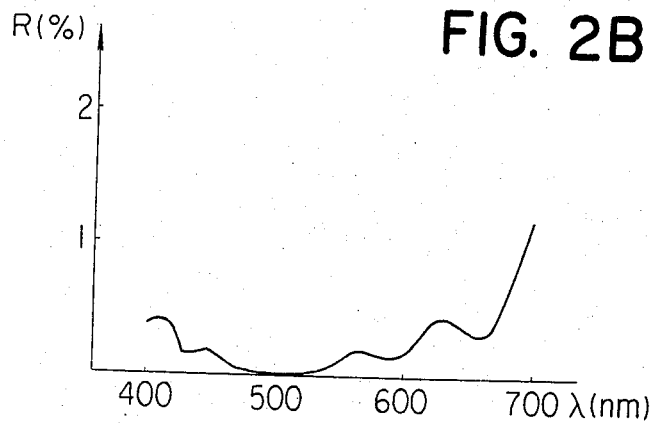
FIG. 2B

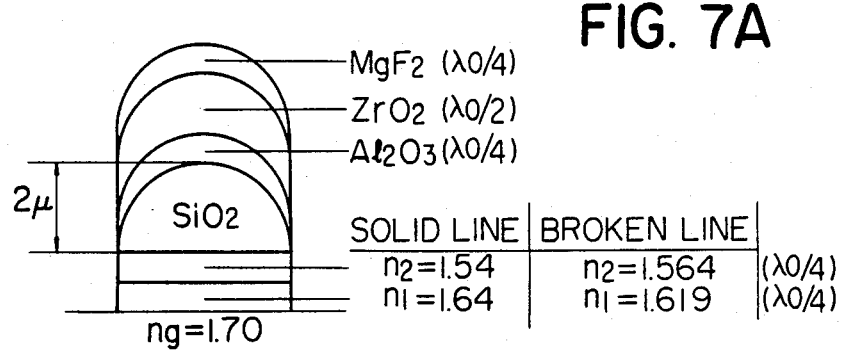
FIG. 7A
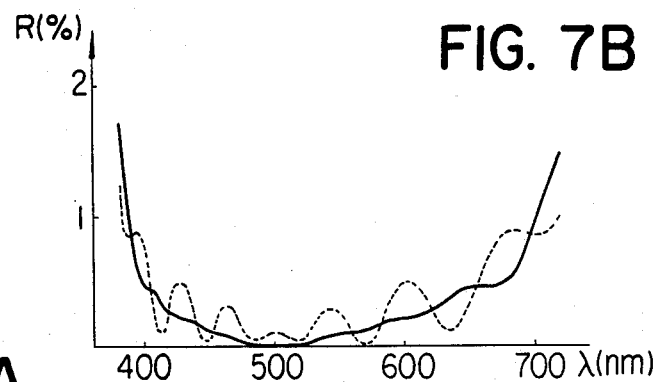
FIG. 7B
FIG. 8A
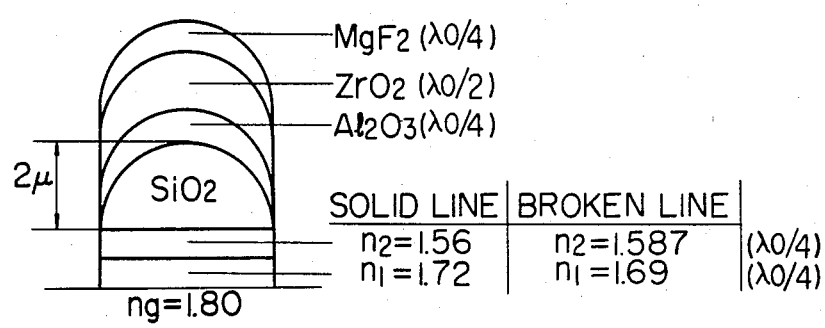
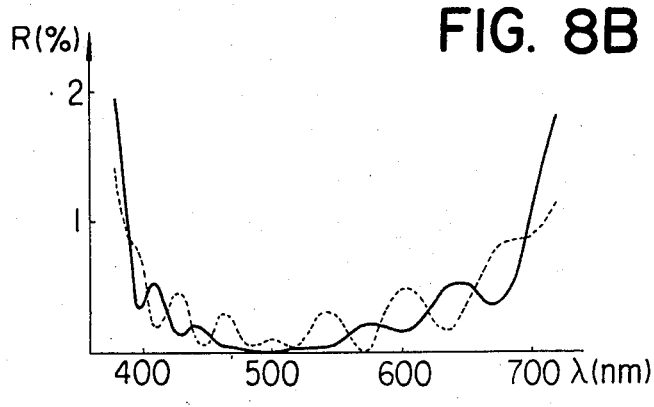
FIG. 8B

REFLECTION PREVENTIVE FILM HAVING AN ASPHERICAL LAYER

BACKGROUND OF THE INVENTION

1. Field of the Invention

This invention relates to an aspherical reflection preventive film containing therein an aspherical thin film layer.

2. Description of the Prior Art

Manufacture of an aspherical lens by abrasion requires a great deal of time and labor, hence a high manufacturing cost inevitably reflects on mass-produced articles such as photographic lenses of a standard focal length. In order to avoid such high manufacturing cost, there have so far been attempted various methods such as a method of varying the refractive index by ion injection, a method of etching the abrasion surface with ion beam, and others. Of these methods, the manufacture of the aspherical film by evaporative deposition provides sufficient possibility to mass-production of the article, if the thickness of the aspherical film does not exceed 10 microns, or so.

It is, however, difficult to manufacture, by the evaporative deposition method, the aspherical film coating having the same refractive index as a lens having a refractive index of from 1.45 to 1.82 or so, since the kind of material used for the evaporative deposition is limited. Accordingly, when the refractive index of the lens is close to that of the aspherical film, e.g., as a lens BK-7 having a refractive index of 1.52 is close to an $SiO_2$ film having a refractive index of 1.49, there is no problem at all. However, when the refractive index of the lens differs from that of the aspherical film, there takes place such a situation that, no effect can be derived from provision of the reflection preventive film on the aspherical film, since reflection occurs at the interface between the lens and the aspherical film coating. As the consequence, when the aspherical thin film is directly provided on the substrate and a group of thin film layers are further provided on it for the purpose of reflection prevention, the residual reflective power is large, so that the reflection prevention characteristic of the thin film layers including the aspherical thin film could not be said to be satisfactory.

SUMMARY OF THE INVENTION

It is an object of the present invention to provide an aspherical reflection preventive film having excellent reflection preventive effect, and which is free from all the disadvantages mentioned above.

The aspherical reflection preventive film according to the present invention is constructed with a first group of thin films consisting of one or more layers of thin films having a uniform thickness, an aspherical thin film which is provided on the first thin film group and having an aspherical shape at the surface opposite to a substrate side, and a second group of thin films consisting of one or more thin film layers and disposed on the aspherical thin film. The word "thin film having a uniform thickness" as used herein signifies that the film thickness is constant at any portion of the film.

In the aspherical reflection preventive film according to the present invention, when the abovementioned first thin film group comprises a single layer, a refractive index $n_1$ of the material to be used for the first thin film group becomes substantially equal to $\sqrt{na \cdot ng}$ (where "na" denotes a refractive index of the aspherical film, and "ng" indicates the refractive index of the substrate). Also, the geometrical film thickness $d_1$ of the thin film should desirably satisfy a relationship $n_1 d_1 = \lambda_0/4$, where $\lambda_0$ denotes a reference wavelength (designed wavelength).

Further, when the first thin film group consists of two layers, the following relationship can be satisfied: $ng < n_1$, $n_2 < na$, or $ng > n_1$, $n_2 > na$, (where $n_1$ is a refractive index of one thin film layer at the side of the substrate, and $n_2$ is a refractive index of the other thin film layer at the side of the aspherical film. At this time, when a thickness of the film having the refractive index $n_1$ is represented by $d_1$ and a thickness of the film having the refractive index $n_2$ is represented by $d_2$, there can be established the conditions for the reflection prevention when the following relationship is satisfied.

$$na \cdot ng = n_1 \cdot n_2$$
$$\tan^2 \frac{\delta}{2} = \frac{n_1 \cdot n_2(ng - na)}{n_2{}^2 ng = n_1{}^2 na}$$

provided that $$\delta = \delta_1 = \delta_2$$
$$\delta_1 = \frac{4\pi}{\lambda} n_1 d_1,$$
$$\delta_2 = \frac{4\pi}{\lambda} n_2 d_2$$

(where reference letter $\lambda$ denotes a wavelength.)

In the aspherical reflection preventive film according to the present invention, it is possible to apply the construction of the conventional reflection preventive film to the abovementioned second thin film group. It is also possible to provide the aspherical thin film in this second thin film group.

In other words, the aspherical reflection preventive film according to the present invention provides a thin film layer consisting of one or more thin films having a uniform thickness between the substrate and the aspherical thin film to thereby remove effectively any harmful reflection occurring between the substrate and the aspherical thin film having a mutually different refraction index, and to obtain an aspherical reflection preventive film excellent in light transmission.

BRIEF DESCRIPTION OF DRAWING

FIGS. 1A and 1B indicate one example of undesirable reflection preventive film using an aspherical thin film, wherein FIG. 1A illustrates a film construction, and FIG. 1B shows its reflection characteristics;

FIGS. 2A and 2B indicate one preferred embodiment of the aspherical reflection preventive film according to the present invention, wherein FIG. 2A illustrates a film construction, and FIG. 2B shows its reflection characteristics;

FIGS. 3A and 3B show another embodiment of the aspherical reflection preventive film according to the present invention, wherein FIG. 3A illustrates a film construction, and FIG. 3B shows its reflection characteristics;

FIGS. 4A and 4B show still another embodiment of the aspherical reflection preventive film according to the present invention, wherein FIG. 4A illustrates a film construction, and FIG. 3B shows its reflection characteristics;

FIGS. 6A and 6B show yet another embodiment of the aspherical reflection preventive film according to the present invention, wherein FIG. 6A illustrates a film construction, and FIG. 6B shows its reflection characteristics;

FIGS. 7A and 7B show another embodiment of the aspherical reflection preventive film according to the present invention, wherein FIG. 7A illustrate a film construction, and FIG. 7B shows its reflection characteristics;

FIGS. 8A and 8B show still another embodiment of the aspherical reflection preventive film according to the present invention, wherein FIG. 8A illustrates a film construction, and FIG. 8B shows its reflection characteristics; and FIGS. 9A and 9B show a further embodiment of the aspherical reflection preventive film according to the present invention, wherein FIG. 9A illustrates a film construction, and FIG. 9B shows its reflection characteristics.

DESCRIPTION OF PREFERRED EMBODIMENTS

Figure 3A:
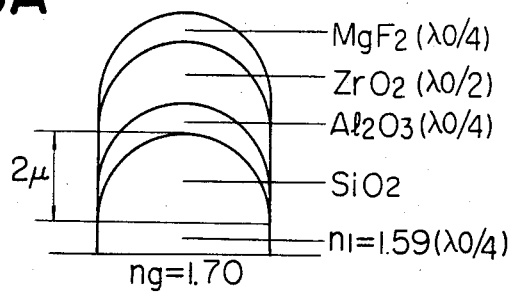

In the following, the present invention will be described in detail in reference to preferred embodiments as illustrated in the accompanying drawing.

FIGS. 1A and 1B show one example of the aspherical reflection preventive film, in which an aspherical thin film layer is directly provided on a substrate and a multi-layered thin film coating is provided over this aspherical thin film layer. FIG. 1A illustrates the construction of the layered film coating, and FIG. 1B represents a characteristic curve of its reflective power. As shown in FIG. 1a, an aspherical thin film of silicon dioxide $SiO_2$ having a refractive index of 1.49 and the maximum deflected quantity of 2 microns from the aspherical surface is directly deposited on a substrate having a refractive index of 1.80. Onto this aspherical thin film, there are sequentially provided, from the side of the aspherical thin film, a thin film of aluminum oxide $Al_2O_3$ having an optical film thickness of $\lambda_0/4$, a thin film of zirconium oxide $ZrO_2$ having an optical film thickness of $\lambda_0/2$, and a thin film of magnesium fluoride $MgF_2$ having an optical film thickness of $\lambda_0/4$. The reflective characteristic at the thickest optical film portion of the aspherical thin film (thickness of 2 microns) is shown in the graphical representation of FIG. 1B, in which the ordinate represents the reflective power R and the abscissa denotes the wavelength $\lambda$. The symbol $\lambda_0$ represents a reference (or designed) wavelength. Since, in this embodiment, $\lambda_0 = 500$, the layers of thin films of $Al_2O_3$, $ZrO_2$ and $MgF_2$ have the respective optical film thickness of 125 nm, 250 nm and 125 nm.

As is apparent from FIG. 1B, when the aspherical thin film is directly provided on the glass substrate, over which a group of thin films are provided for preventing reflection, the residual reflective power exceeds 2%, and the reflection preventive characteristic of the thin film layer including the aspherical thin film cannot be said to be satisfactory.

Referring to FIGS. 2A and 2B, as another embodiment of the present invention, the construction of the reflection preventive film is such that a single layer film having a refractive index of 1.54, e.g., $ThF_4$ or $ThOF_2$, is evaporatively deposited onto a glass substrate having a refractive index of 1.60 to an optical film thickness of 125 nm. Onto this single layer film, there is further provided an aspherical thin film of $SiO_2$ having a refractive index of 1.49. Onto this aspherical thin film, there are further coated sequentially, from the side of the aspherical thin film, the three layers of the reflection preventive films shown in FIG. 1A as the second group of the thin films composed of $Al_2O_3$ in an optical film thickness of 125 nm, $ZrO_2$ in 250 nm, and $MgF_2$ in 125 nm, respectively. The reference wavelength $\lambda_0$ is 500 nm. The aspherical thin film has the maximum deflected quantity of 2 microns from the spherical surface. The graphical representation in FIG. 2B denotes the reflection characteristics of the thickest optical film thickness portion of the aspherical thin film. Since the aspherical thin film shown in FIG. 2A has the maximum deflecting quantity of 2 microns as mentioned above, the thinnest portion of the film thickness is zero. The reason for idicating the reflection characteristic at this thickest portion of the aspherical thin film is that the characteristic at this film portion is the worst among other portions in the film. The reflection characteristic of the other, thinner portions in the film, indicate better reflection characteristics. As is apparent from the characteristic curve in FIG. 2B, the residual reflective power can be controlled within almost 0.5% in a desired wavelength band, hence the effect of the aspherical reflection preventive film according to the present invention is evident, when compared with the characteristic curve in FIG. 1B.

In other embodiments of the present invention to be described hereinbelow, the thinnest portion of the aspherical thin film is zero and the thickest portion thereof corresponds to the value of the maximum deflecting quantity. The graphical representation showing each of the reflective characteristics (or, inversely, the transmission characteristic) denotes the characteristics at the thickest portion of the aspherical thin film at each embodiment. Further, in the aspherical reflection preventive films corresponding to the characteristic curves shown in FIGS. 3B to to 8B to be explained hereinafter, the reference wavelength $\lambda_0$ is 500 nm, and the construction of the second group of the thin films is exactly the same as that shown in FIGS. 1A and 2A, hence any detailed exaplanations thereof will be dispensed with.

Figure 3B:
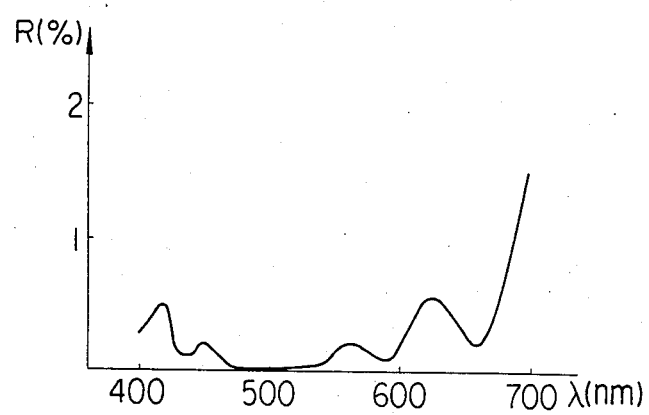

Referring to FIGS. 3A and 3B, the construction of the aspherical reflection preventive film is such that a single layer film having a refractive index of 1.59, e.g., $ThOF_2$ or $LaF_3$, is evaporatively deposited onto a glass substrate having a refractive index of 1.70 to an optical film thickness of 125 nm. Onto this single layer film, there is evaporatively deposited an aspherical thin film of $SiO_2$ having a refractive index of 1.49. Onto this aspherical thin film, there is further provided the above-mentioned second group of thin films. This aspherical thin film has the maximum deflecting quantity of 2 microns from the spherical surface.

Figure 4A:
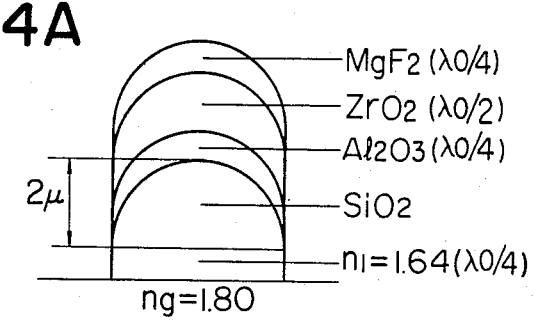
Figure 4B:
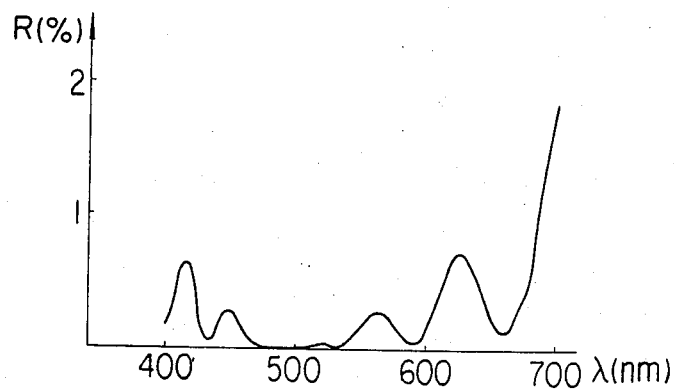

Referring to FIGS. 4A and 4B, the construction of the aspherical reflection preventive film is such that a single layer film having a refractive index of 1.64, e.g., $Al_2O_3$, etc., is evaporatively deposited onto a glass substrate having a refractive index of 1.80 to an optical film thickness of 125 nm. Onto this single layer film, there is evaporatively deposited an aspherical thin film of $SiO_2$ having a refractive index of 1.49. Over this aspherical thin film, there is further coated the second thin film group of the above-described structure. This aspherical thin film has the maximum deflecting quantity of 2 microns from the spherical surface.

Figure 5:
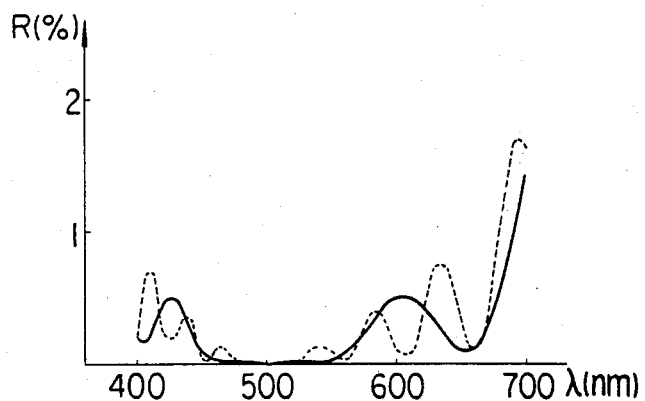
FIG. 5 is a graphical representation showing the reflectivity characteristics of one embodiment of the aspherical reflection preventive film according to the present invention.

FIG. 5 represents the reflective characteristics of the aspherical reflection preventive film of the construction as explained with reference to FIG. 4A, when the maximum deflecting quantity of the aspherical thin film is varied. In this graphical representation, the characteristic curve shown in solid line represents a case wherein the maximum deflecting quantity from the spherical surface is 1 micron, and the characteristic curve shown in broken line denotes a case wherein the maximum deflecting quantity fromm the spherical surface is 3 microns.

The characteristic curves shown in FIGS. 2B to 5 are all for the cases, in which the first group of thin film comprises a single layer. In the following, explanations will be given as to the cases, wherein the first thin film group consists of two layers.

Figure 6A:
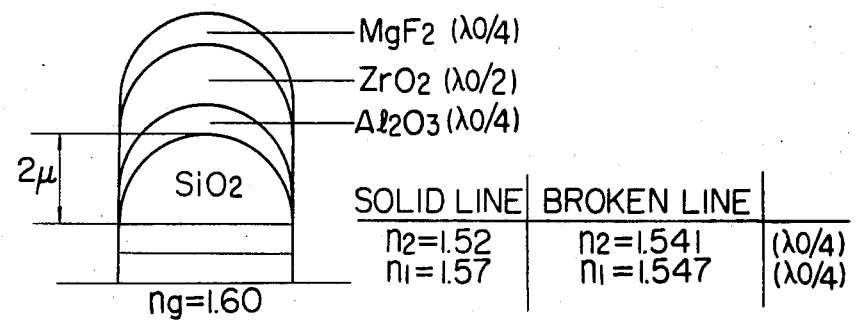
Figure 6B:
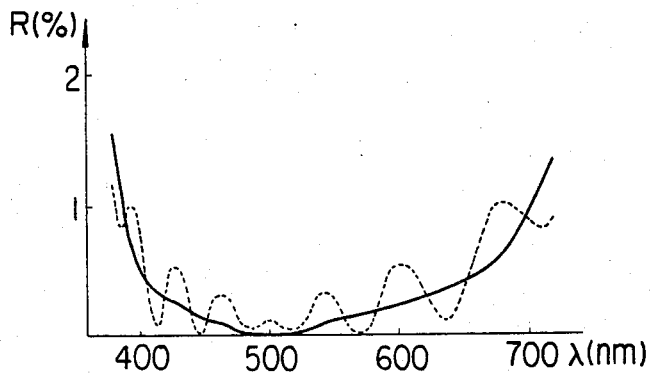

Referring to FIGS. 6A and 6B, the construction of the aspherical reflection preventive film is such that double layered films as the first thin film group are evaporatively deposited onto a glass substrate having a refractive index of 1.60. Onto the double layered films, there are sequentially deposited the aspherical thin film and the second thin film group of the same construction as those shown in FIG. 2A. The characteristic curve in solid line in FIG. 6B shows a case, in which the first layer in the first thin film group has the refractive index of 1.57 and the second layer has the refractive index of 1.52, respectively as arranged in sequence from the side of the substrate, and the optical film thickness of each film is 125 nm. The characteristic curve in broken line shows a case, wherein the first layer has the refractive index of 1.547 and the second layer has the refractive index of 1.541, and the optical film thickness of each layer is 125 nm.

Referring to FIGS. 7A and 7B, the construction of the aspherical reflection preventive film is such that the two layered films as the first thin film group are evaporatively deposited onto a glass substrate having a refractive index of 1.70. Onto these two layered films, there are sequentially deposited the aspherical thin film and the second thin film group of the same construction as those shown in FIG. 2A. The characteristic curve in solid line in FIG. 7B shows a case, wherein the first layer and the second layer in the first thin film group as arranged from the side of the substrate have their respective refractive indexes of 1.64 and 1.54 and the optical film thickness of each layer is 125 nm. The characteristic curve in broken line shows a case, wherein the first and second layers have their respective refractive indexes of 1.619 and 1.564, and the optical film thickness of each layer is 125 nm.

Referring to FIGS. 8A and 8B, the construction of the aspherical reflection preventive film is such that two-layered films as the first thin film group are evaporatively deposited onto a glass substrate having a refractive index of 1.80. Onto the two-layered films, there are sequentially deposited the aspherical thin film and the second thin film group of the same construction as those shown in FIG. 2A. The characteristic curve in solid line in FIG. 8B shows a case, wherein the first and second layers in the first thin film group as arranged from the side of the substrate have their respective refractive indexes of 1.72 and 1.56. The characteristic curve in broken line shows a case, in which the first and second layers have their respective refractive indexes of 1.69 and 1.587, and the optical film thickness of each layer is 125 nm.

Figure 9A:
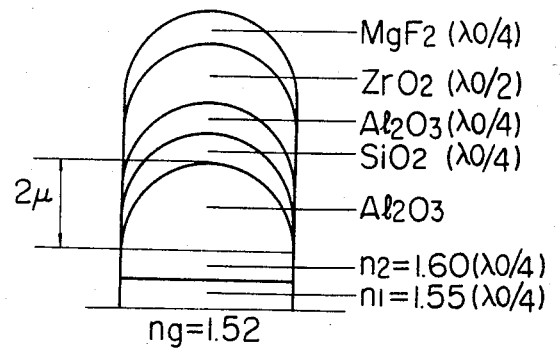
Figure 9B:
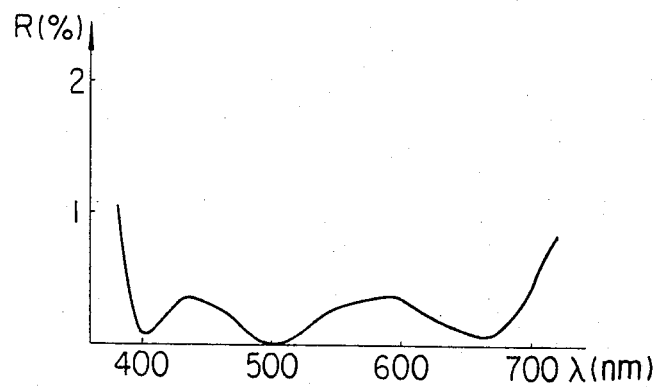

Referring to FIGS. 9A and 9B, the construction of the aspherical reflection preventive film is such that a layer having a refractive index of 1.55 and an optical film thickness of 125 nm and another layer having a refractive index of 1.60 and an optical film thickness of 125 nm are sequentially deposited on the glass substrate having a refractive index of 1.52. Onto these two-layered films, there is coated an aspherical thin film of aluminum oxide having a refractive index of 1.63. Over to this aspherical thin film, there is further coated a four-layer film. Each of the four layers has its own refractive index and optical film thickness as follows: the first layer as counted from the side of the aspherical sufrace, 1.49 and 125 nm; the second layer, 1.63 and 125 nm; the third layer 2.1 and 250 nm; and the fourth layer, 1.38 and 125 nm.

As shown in FIGS. 6A to 9B, the characteristic curves indicate satisfactory reflection preventive effects, even when the first thin film group consists of two layers, in which case selection of the material to be evaporatively deposited is facilitated.

What we claim is:

1. A reflection preventive film having an aspherical thin film layer, comprising:
    a substrate;
    a first thin film group consisting of at least one thin film layer having a uniform thickness, said first thin film group being provided on said substrate;
    an aspherical thin film having non-uniform film thickness and an aspherical shape at the surface opposite to the side of said substrate, said aspherical thin film being provided on said first thin film group, said aspherical thin film having a refractive index different from the refractive index of each layer of said first thin film group; and
    a second thin film group consisting of at least one thin film layer, said second thin film group being provided on said aspherical thin film.

2. The reflection preventive film as set forth in claim 1, wherein said first thin film group consists of a single layer, a refractive index of said single layer is substantially equal to $\sqrt{ng \cdot na}$ (where ng denotes a refractive index of said substrate, and na denotes a refractive index of said aspherical thin film), and the film thickness of said single layer is substantially equal to a quarter of a reference wavelength $\lambda_0$.

3. The reflection preventive film as set forth in claim 1, wherein said first thin film group consists of two layers, and each layer has a relationship of $ng < n_1$ and $n_2 < na$ (where $n_1$ is a refractive index of the thin film layer at the side of said substrate; $n_2$ is a refractive index of the thin film layer at the side of the aspherical thin film; ng is the refractive index of the substrate; and na is the refractive index of the aspherical thin film).

4. The reflection preventive film as set forth in claim 1, wherein said first thin film consists of two layers, and each layer has a relationship of $ng > n_1$ and $n_2 > na$ (where $n_1$ is the refractive index of the layer at the side of the substrate; $n_2$ is the refractive index of the layer at the side of the aspherical thin film; ng is the refractive index of the substrate; and na is the refractive index of the aspherical thin film).

5. The reflection preventive film as set forth in claim 3 or 4, wherein film thickness of each of the two layers constituting said first thin film group is substantially uniform throughout, and is substantially a quarter of the reference wavelength $\lambda_0$.

* * * * *